(12) United States Patent  
Hofler et al.

(10) Patent No.: US 8,210,987 B2
(45) Date of Patent: Jul. 3, 2012

(54) METHOD FOR ACTUATING AN INTERWHEEL DIFFERENTIAL LOCKS

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 344 days.

(21) Appl. No.: 12/701,078

(22) Filed: Feb. 5, 2010

(65) Prior Publication Data

US 2010/0234175 A1    Sep. 16, 2010

(30) Foreign Application Priority Data

Mar. 11, 2009  (DE) .......................... 10 2009 001 492

(51) Int. Cl.
*B60W 10/12* (2012.01)

(52) U.S. Cl. ......................................................... 477/35

(58) Field of Classification Search .................... 477/35, 477/115, 904
See application file for complete search history.

(56) References Cited

U.S. PATENT DOCUMENTS

| 7,641,585 | B2 * | 1/2010 | Baldet ............................ 477/35 |
| 2008/0076630 | A1 * | 3/2008 | Fayyad et al. ................... 477/35 |
| 2008/0081731 | A1 * | 4/2008 | Scheer et al. ................... 477/35 |
| 2008/0103018 | A1 * | 5/2008 | Peura et al. .................... 477/35 |
| 2009/0318261 | A1 * | 12/2009 | Tabata et al. ..................... 477/3 |

FOREIGN PATENT DOCUMENTS

DE            103 35 475 A1    2/2005

* cited by examiner

*Primary Examiner* — Edwin A Young
(74) *Attorney, Agent, or Firm* — Davis & Bujold, P.L.L.C.

(57) ABSTRACT

A method of actuating an interwheel differential lock of a mobile vehicle. The interwheel differential lock is actuated to engage depending on the speed of the vehicle, the accelerator pedal position and the gradient of the torque at the transmission output.

4 Claims, 1 Drawing Sheet

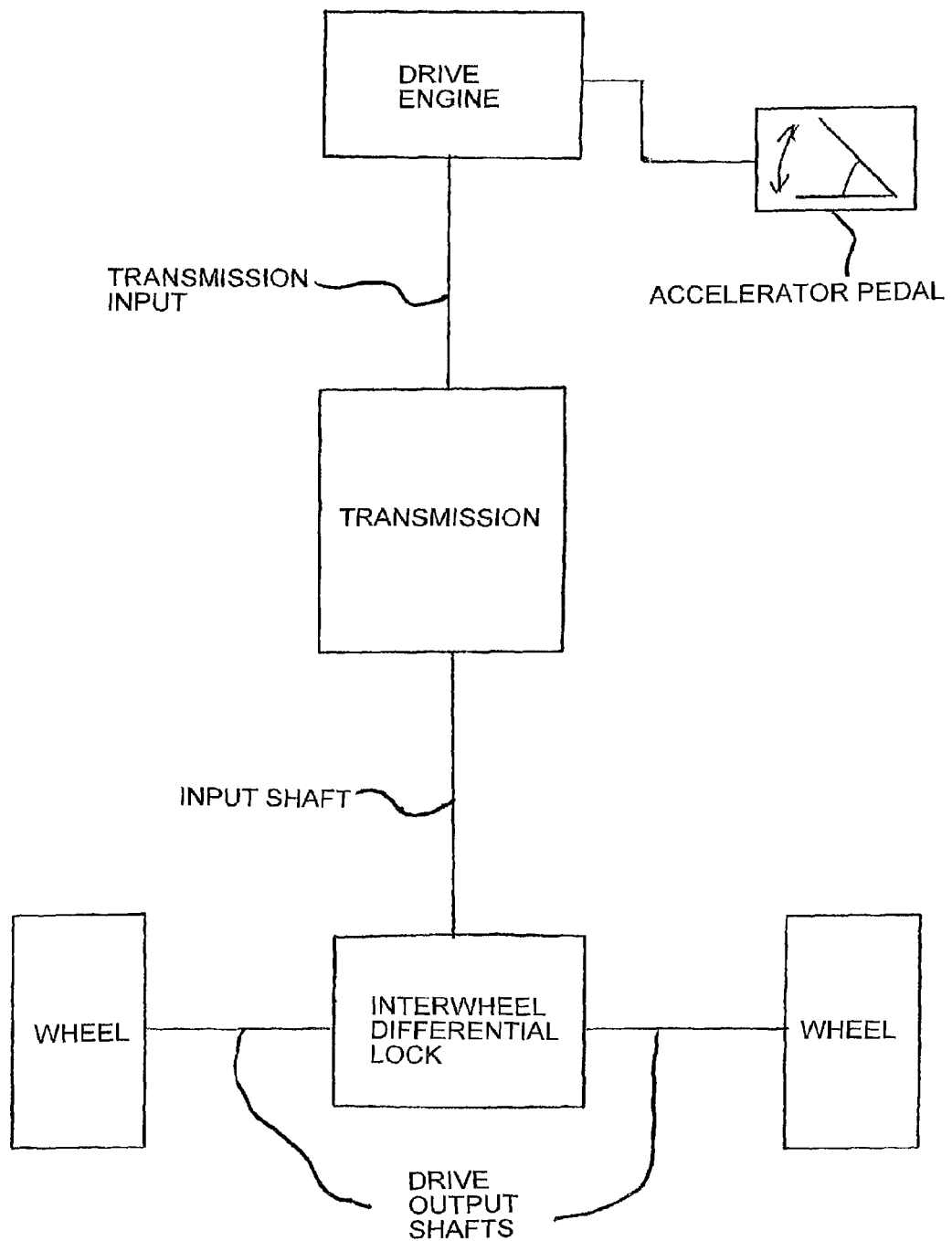

METHOD FOR ACTUATING AN INTERWHEEL DIFFERENTIAL LOCKS

This application claims priority from German patent application serial no. 10 2009 001 492.6 filed Mar. 11, 2009.

FIELD OF THE INVENTION

The invention relates to a method for actuating an interwheel differential lock.

BACKGROUND OF THE INVENTION

Interwheel differential locks for locking differentials are used for example in off-road vehicles such as articulated wheel loaders or dump trucks or agricultural tractors, to suspend the compensating action of the differential.

DE 103 35 475 A1 discloses a method for actuating interwheel differential locks, which are actuated in the opening or closing direction as a function of the driving speed and the acceleration of an output shaft of a transmission.

SUMMARY OF THE INVENTION

The purpose of the present invention is to provide a method for actuating an interwheel differential lock, by virtue of which operational reliability is further improved.

According to the invention, beside the input rotational speed in the differential, the position of the accelerator pedal and the torque at the transmission input and therefore the output torque of the hydrodynamic torque converter, or in the case of a directly connected drive engine the output torque of the drive engine, are used.

BRIEF DESCRIPTION OF THE DRAWINGS

The invention will now be described, by way of example, with reference to the accompanying sole FIGURE of drawing which is a diagrammatic representation of the various elements of the present invention.

DETAILED DESCRIPTION OF THE PREFERRED EMBODIMENTS

In this case the invention is based on the fact that if the position of the accelerator pedal of the drive engine is unchanged and a wheel is slipping, the transmission input torque remains unchanged or decreases. If the wheel had not slipped so that a direct friction force existed between the road and the wheel, the vehicle would accelerate and this would result in increasing the speed of the drive engine, for example a diesel engine, whereby the torque at the transmission input would also increase.

In addition to the criteria disclosed in DE 103 35 475 A1, to actuate the lock in the closing direction, the gradient of the transmission input torque and the gradient of the accelerator pedal position are used as well. This provides the possibility of controlling the lock in an automated way and thus operating the vehicle more reliably.

In a further embodiment of the invention the limit value at which the lock is actuated in the closing direction is varied as a function of the accelerator pedal position. For example, if a wheel is slipping and at the same time the accelerator pedal is pressed, it is possible that the gradient of the transmission input torque will increase. To counteract this, as a function of the gradient and the change of the accelerator pedal position, the limit value of the gradient for varying the transmission input torque is shifted. In this way, even if the accelerator pedal is varied and a wheel slips, it is recognized that the speed change at the transmission output is produced by a slipping wheel on the axle and the lock is then actuated in the closing direction.

In a further embodiment of the invention it is also possible to use steering angle sensors, which automatically open the lock beyond a defined steering angle.

In a further embodiment of the invention, when the lock has been actuated in the closing direction, it can be re-actuated in the opening direction in a time-controlled manner when previously defined limit values of the drive output speed and the output torque are reached.

Thanks to the present invention the lock is not already actuated in the closing direction during normal acceleration of the vehicle without any wheel slip. In this way, maneuverability and wear are reduced.

The invention claimed is:

1. A method of actuating an interwheel differential lock with an input shaft actively connected with a transmission such that a transmission input is actively connected to a drive engine, and drive output shafts are connected to vehicle wheels such that the interwheel differential lock is actuated in an engaging direction if acceleration of a speed of the input shaft of the interwheel differential lock exceeds a limit value, the method comprising the step of:

adjusting the limit value as a function of a gradient of torque at the transmission input and as a function of an accelerator pedal position; and adjusting the limit value such that when a position of the accelerator pedal for the drive engine remains unchanged and, at the same time, the speed of the input shaft accelerates while the torque at the transmission input is not increasing, actuating the interwheel differential lock in the engaging direction.

2. The method of actuating the interwheel differential lock according to claim 1, further comprising the step of adjusting the limit value such that, if the position of the accelerator pedal for the drive engine remains unchanged and, at the same time, the speed of the input shaft accelerates and the gradient of the torque at the transmission input is increasing, the interwheel differential lock is not actuated in the engaging direction.

3. The method of actuating the interwheel differential lock according to claim 1, further comprising the step of adjusting the limit value such that, if the position of the accelerator pedal for the drive engine is changed in a full-throttle direction and, at the same time, the speed of the input shaft accelerates and the gradient of the torque at the transmission input is increasing, the interwheel differential lock is not actuated in the engaging direction.

4. The method of actuating the interwheel differential lock according to claim 1, further comprising the step of, after being actuated in the engaging direction, only actuating the interwheel differential lock in a disengaging direction after a lapse of a predefined time interval.

* * * * *